(12) United States Patent
Cymbal

(10) Patent No.: US 7,874,588 B2
(45) Date of Patent: Jan. 25, 2011

(54) TELESCOPICALLY ADJUSTABLE STEERING COLUMN ASSEMBLY

(75) Inventor: William D. Cymbal, Freeland, MI (US)

(73) Assignee: Nexteer (Beijing) Technology Co., Ltd.

( * ) Notice: Subject to any disclaimer, the term of this patent is extended or adjusted under 35 U.S.C. 154(b) by 351 days.

(21) Appl. No.: 12/030,749

(22) Filed: Feb. 13, 2008

(65) Prior Publication Data

US 2009/0200783 A1 Aug. 13, 2009

(51) Int. Cl.
  *B62D 1/18* (2006.01)
(52) U.S. Cl. .......................... 280/775; 280/777; 74/492
(58) Field of Classification Search .................. 280/775, 280/777; 74/492
  See application file for complete search history.

(56) References Cited

U.S. PATENT DOCUMENTS

| | | | | |
|---|---|---|---|---|
| 5,306,032 A | * | 4/1994 | Hoblingre et al. | 280/775 |
| 5,605,351 A | * | 2/1997 | Higashino | 280/775 |
| 5,722,300 A | | 3/1998 | Burkhard et al. | |
| 6,343,993 B1 | * | 2/2002 | Duval et al. | 464/167 |
| 7,168,741 B2 | * | 1/2007 | Kinme et al. | 280/777 |
| 7,410,190 B2 | * | 8/2008 | Sawada et al. | 280/777 |
| 7,445,241 B2 | * | 11/2008 | Higashino | 280/777 |
| 7,481,130 B2 | * | 1/2009 | Yamada et al. | 74/493 |
| 7,497,470 B2 | * | 3/2009 | Streng et al. | 280/777 |
| 7,559,266 B2 | * | 7/2009 | Kurokawa | 74/492 |
| 2006/0117898 A1 | | 6/2006 | Schneider et al. | |
| 2007/0039403 A1 | | 2/2007 | Manwaring et al. | |

* cited by examiner

*Primary Examiner*—Toan C To
(74) *Attorney, Agent, or Firm*—Cantor Colburn LLP

(57) ABSTRACT

A steering column assembly comprises an upper jacket, a lower jacket extending along a longitudinal axis, and a bushing apparatus disposed therebetween. The upper jacket and the lower jacket include a circular cross section. The bushing apparatus includes a first contact surface, a second contact surface and a third contact surface disposed radially about the longitudinal axis and equally spaced from each other. A compression device is coupled to one of the lower jacket and the upper jacket for applying a compressive force to the first contact surface. The second contact surface and the third contact surface resist the compressive force. The compression device is adjustable to vary a slip resistance between the bushing apparatus and one of the upper jacket and lower jacket.

13 Claims, 5 Drawing Sheets

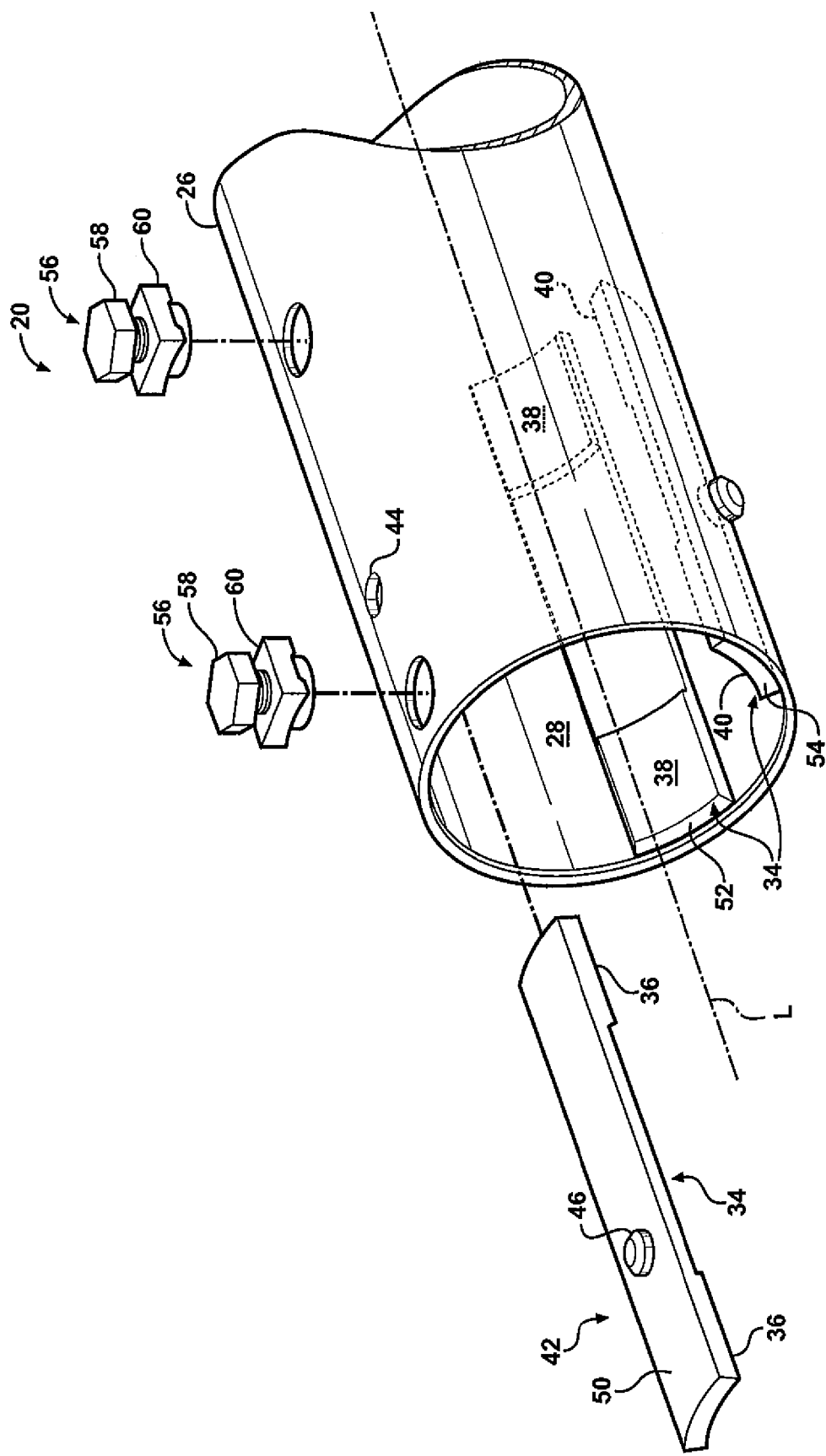

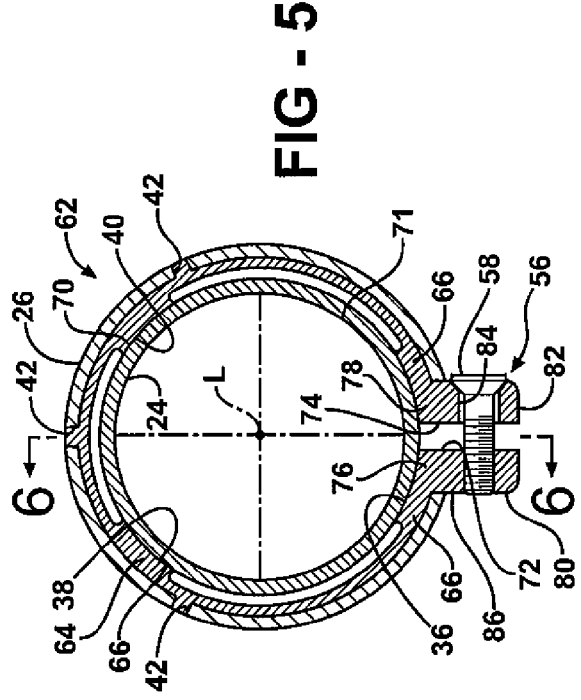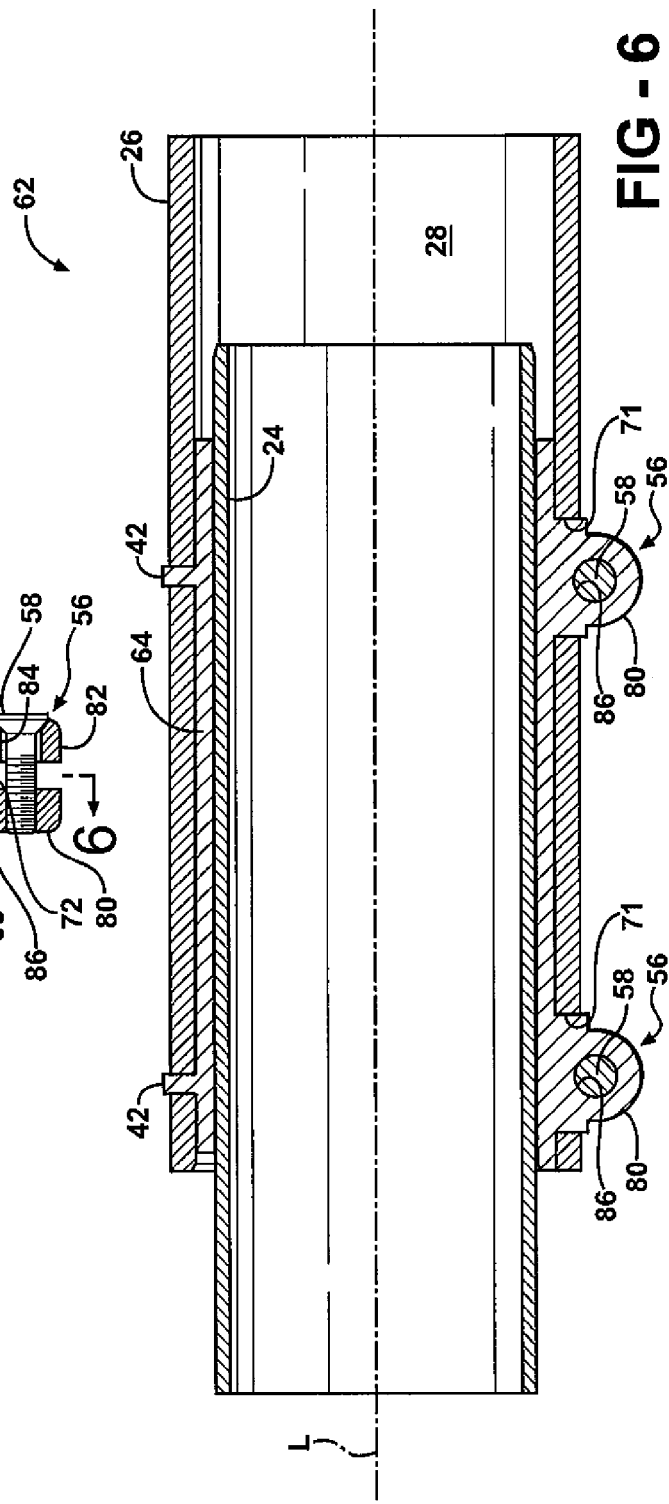

TELESCOPICALLY ADJUSTABLE STEERING COLUMN ASSEMBLY

BACKGROUND OF THE INVENTION

1. Field of the Invention

The subject invention relates to a steering column assembly for a vehicle, and more specifically to a telescopically adjustable steering column assembly.

2. Description of the Prior Art

Many vehicles include an adjustable steering column that is telescopically adjustable along a longitudinal axis. Typically, these telescopically adjustable steering columns include an upper jacket in sliding telescopic engagement with a lower jacket. A bushing is disposed between the upper jacket and the lower jacket to establish a smooth sliding interface therebetween.

Typically, a pre-manufactured bushing is disposed between the upper jacket and the lower jacket and plastic is injected in place between the bushing and the upper jacket to compress the bushing against the lower jacket. The quality of the sliding fit between the upper jacket and the lower jacket in such molded-in-place bushings varies in relation to the instantaneous injection molding pressure at the time of the over molding process. Because the injection pressure is difficult to control in a high production manufacturing setting, substantial variability may exist from one column assembly to the next. This variability leads to an unpredictable slip resistance between the bushing and the upper jacket or the lower jacket, i.e., the amount of force required to telescopically adjust the steering column assembly may vary from one steering column assembly to the next.

SUMMARY OF THE INVENTION AND ADVANTAGES

The subject invention provides a steering column assembly for a vehicle. The steering column assembly comprises a lower jacket extending along a longitudinal axis. An upper jacket is longitudinally moveable relative to the lower jacket along the longitudinal axis. A bushing apparatus is disposed between the lower jacket and the upper jacket. The bushing defines at least a first contact surface and a second contact surface. An adjustable compression device is coupled to one of the upper jacket and the lower jacket. The adjustable compression device applies a compressive force directed radially inward toward the longitudinal axis to the first contact surface. The compressive force is resisted by the second contact surface, thereby obtaining a desired slip resistance between the bushing apparatus and one of the upper jacket and the lower jacket.

Accordingly, the adjustable compression device eliminates the lash between the bushing apparatus and one of the upper jacket and the lower jacket and adjusts the slip resistance between the bushing apparatus and one of the upper jacket and the lower jacket. Because the adjustable compression device may be loosened, the adjustable compression device permits disassembly of the steering column assembly for maintenance and reduces manufacturing costs of the steering column assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a partial fragmentary exploded perspective view of the steering column assembly;

FIG. 5 is a cross sectional view of an alternative embodiment of the steering column assembly; and FIG. 6 is a side plan view of the alternative embodiment of the steering column assembly.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle and rotatably supports a steering wheel (not shown) as is well known. The steering column assembly 20 is telescopically adjustable and extends along a longitudinal axis L.

Figure 1:
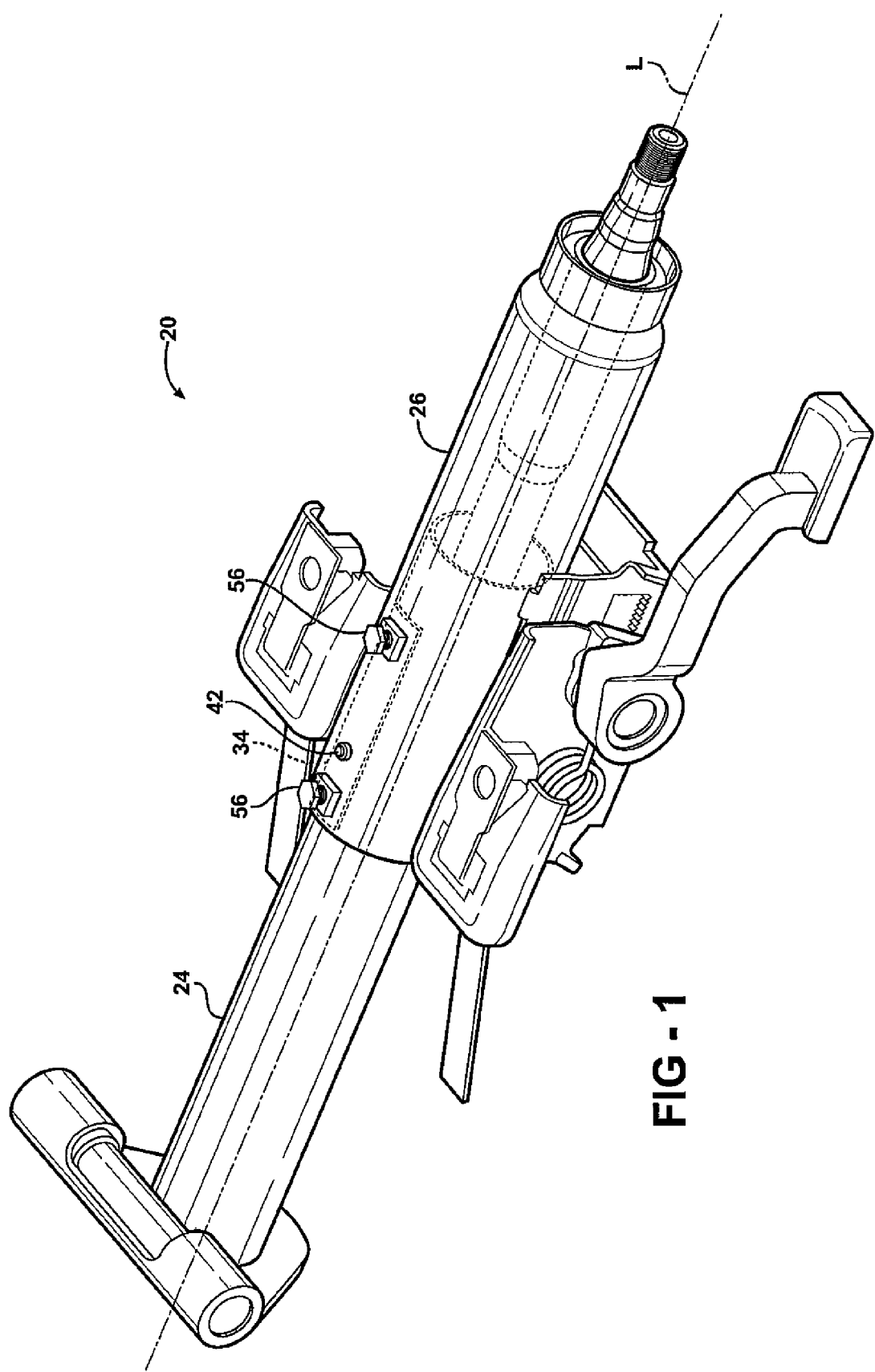
FIG. 1 is a perspective view of a steering column assembly.

Referring to FIG. 1, the steering column assembly 20 comprises a lower jacket 24 and an upper jacket 26. The lower jacket 24 and the upper jacket 26 are coaxially aligned and extend along the longitudinal axis L. Preferably, the upper jacket 26 defines an interior 28 and includes a circular cross section having an upper jacket diameter 30. The lower jacket 24 also includes a circular cross section having a lower jacket diameter 32. The lower jacket diameter 32 is less than the upper jacket diameter 30. Accordingly, the lower jacket 24 is partially disposed within the interior 28 of the upper jacket 26 with the upper jacket 26 longitudinally moveable relative to the lower jacket 24 along the longitudinal axis L. However, it should be appreciated that the relative position of between the upper jacket 26 and the lower jacket 24 may be reversed, in which case the lower jacket 24 would define the interior 28, and the lower jacket diameter 32 would be greater than the upper jacket diameter 30 with the upper jacket 26 disposed within and slideable relative to the lower jacket 24.

Figure 2:
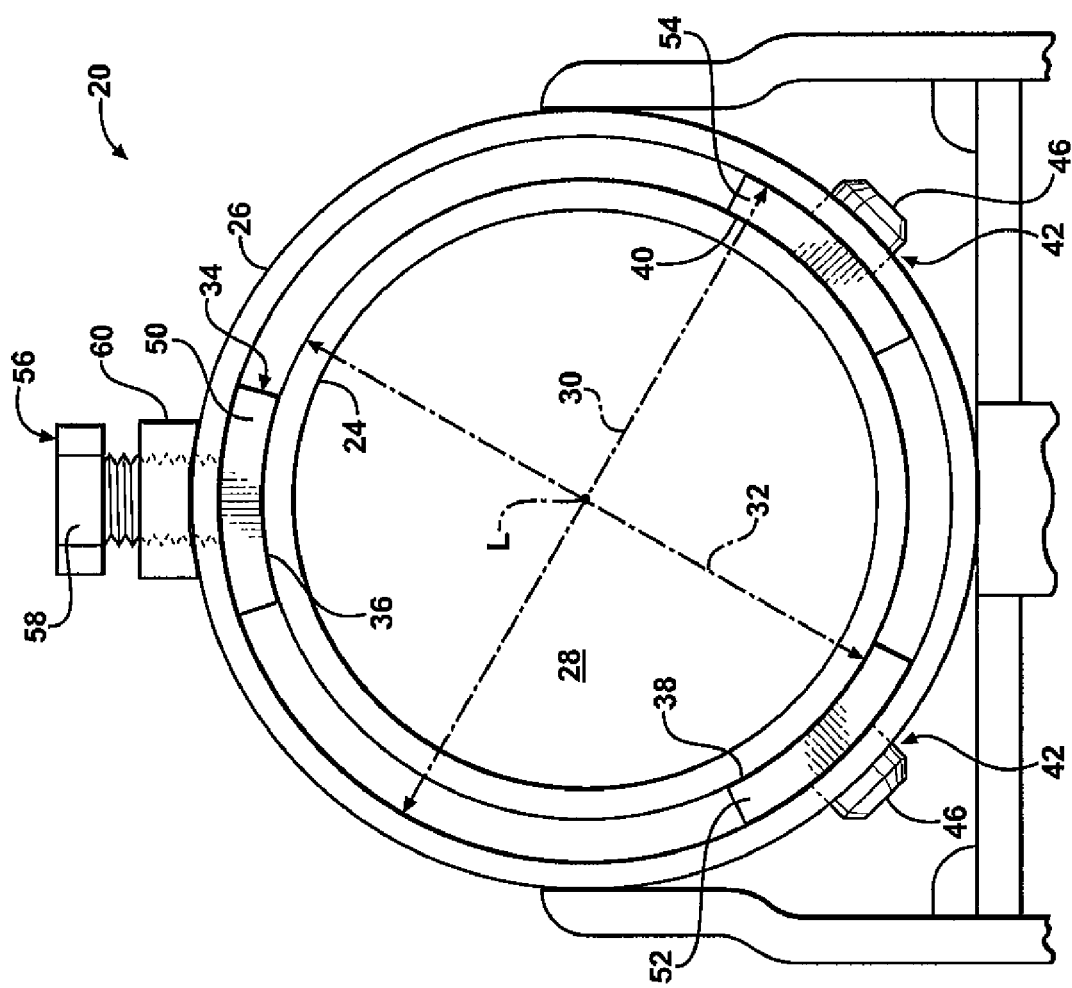
FIG. 2 is a cross sectional view of the steering column assembly.
Figure 3:
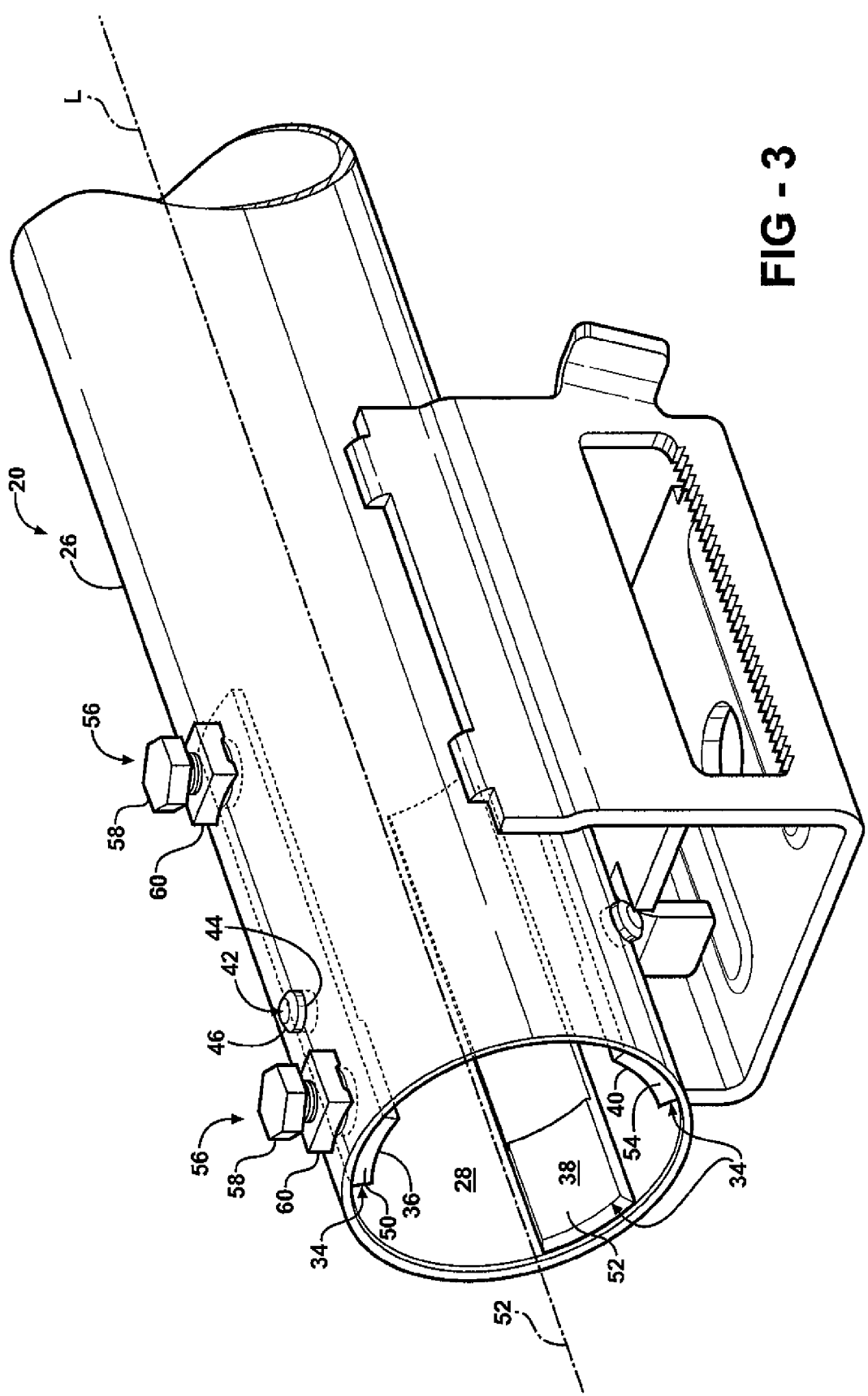
FIG. 3 is fragmentary perspective view of the steering column assembly.

Referring to FIGS. 2 through 4, a bushing apparatus 34 is disposed between the lower jacket 24 and the upper jacket 26. The bushing apparatus 34 defines at least a first contact surface 36 and a second contact surface 38, with the first contact surface 36 being disposed opposite the longitudinal axis L from the second contact surface 38. Preferably, the bushing apparatus 34 defines the first contact surface 36, the second contact surface 38 and a third contact surface 40 to provide a three (3) point support for one of the lower jacket 24 and the upper jacket 26. The first contact surface 36, the second contact surface 38 and the third contact surface 40 are disposed radially about the longitudinal axis L. Preferably, the first contact surface 36, the second contact surface 38 and the third contact surface 40 are equally spaced from one another radially about the longitudinal axis L, i.e., the first contact surface 36, the second contact surface 38 and the third contact surface 40 are spaced form the longitudinal axis L and are radially spaced one hundred twenty degrees (120°) relative to each other. The first contact surface 36, the second contact surface 38 and the third contact surface 40 define the sliding interface between the bushing apparatus 34 and one of the upper jacket 26 and the lower jacket 24.

As shown, the bushing apparatus 34 is coupled to the upper jacket 26 and is in sliding engagement with the lower jacket 24. It should be appreciated, however, that the bushing apparatus 34 may alternatively be coupled to the lower jacket 24 and be in sliding engagement with the upper jacket 26. A locating device 42 interconnects the bushing apparatus 34 and the upper jacket 26 to fixedly locate the bushing apparatus 34 relative to the upper jacket 26. The upper jacket 26 defines at least one aperture 44 and the locating device 42 includes at least one lug 46 mounted to the bushing apparatus 34 with the at least one lug 46 extending through the at least one aperture 44 to locate the bushing apparatus 34 within the interior 28 and prevent axial movement of the bushing apparatus 34 along the longitudinal axis L during telescopic adjustment of the upper jacket 26 relative to the lower jacket 24. It should be appreciated that the locating device 42 may be configured other than shown or described herein. Preferably, the steering column assembly 20 includes a plurality of locating devices 42.

Preferably, the bushing apparatus 34 comprises a polymer material. However it should be appreciated that the bushing apparatus 34 may comprise and be manufactured from a material other than a polymer. Additionally, the first contact surface 36, the second contact surface 38 and the third contact surface 40 of the bushing apparatus 34 may include a PTFE material to decrease friction between the bushing apparatus 34 and one of the upper jacket 26 and the lower jacket 24.

Preferably, the bushing apparatus 34 comprises a first block 50, a second block 52 and a third block 54, each being independent and separate pieces cooperating together to define the bushing apparatus 34. Accordingly, each of the first block 50, the second block 52 and the third block 54 include the locating device 42 to independently locate each of the first block 50, the second block 52, and the third block 54 within the interior 28.

The first block 50 extends along the longitudinal axis L and defines the first contact surface 36, the second block 52 extends along the longitudinal axis L and defines the second contact surface 38, and the third block 54 extends along the longitudinal axis L and defines the third contact surface 40. The first contact surface 36 may include a plurality of first contact surfaces 36 spaced from each other along the longitudinal axis L. Likewise, the second contact surface 38 may include a plurality of second contact surfaces 38 spaced from each other along the longitudinal axis L and the third contact surface 40 may include a plurality of third contact surfaces 40 spaced from each other along the longitudinal axis L.

An adjustable compression device 56 is coupled to one of the upper jacket 26 and the lower jacket 24. As shown, the compression device 56 is coupled to the upper jacket 26. The compression device 56 applies a compressive force that is directed radially inward toward the longitudinal axis L. The compressive force is directed toward the first contact surface 36 and is resisted by the second contact surface 38. If the bushing apparatus 34 includes the third contact surface 40, then the compressive force is applied to the first contact surface 36 and is resisted by both the second contact surface 38 and the third contact surface 40. The compressive force applied to and resisted by the first contact surface 36, the second contact surface 38 and the third contact surface 40 obtains a desired slip resistance between the bushing apparatus 34 and the lower jacket 24. The slip resistance is equal to the amount of force required to move the upper jacket 26 relative to the lower jacket 24. A higher slip resistance requires a higher force to adjust the steering column assembly 20, whereas a lower slip resistance lessens the force required to adjust the steering column assembly 20.

The slip resistance is customizable by varying the magnitude of the compressive force applied. Preferably, the compression device 56 includes a threaded adjuster 58 in threaded engagement with the upper jacket 26 and coupled to one of the first block 50, the second block 52 or the third block 54 of the bushing apparatus 34. The upper jacket 26 includes a threaded nut 60 mounted to the upper jacket 26. The threaded adjuster 58 is in threaded engagement with the threaded nut 60 and is rotatably coupled to the first block 50. As shown, the compression device 56 includes a pair of threaded adjusters 58 spaced apart from each other along the longitudinal axis L. Alternatively, the compression device 56 may include a spring or some other device capable of providing the compressive force to the bushing apparatus 34.

The compressive force is applied and the slip resistance increased by advancing the threaded adjuster 58 into the threaded nut 60, thereby urging the first block 50 coupled to the adjuster radially inward toward the longitudinal axis L and against the lower jacket 24. The compressive force is released and the slip resistance is lessened by withdrawing the adjusted from the threaded nut 60, thereby permitting the first block 50 coupled to the adjuster to move radially outward away from the longitudinal axis L and away from the lower jacket 24. Releasing the compressive force permits disassembly of the steering column assembly 20 for maintenance, including replacement of the bushing apparatus 34 if necessary. This was not previously possible with prior art in-place injection molded bushings.

Referring to FIGS. 5 and 6, an alternative embodiment of the steering column assembly is shown generally at 62. The alternative embodiment of the steering column assembly 62 includes an alternative bushing apparatus 64 having a non-continuous circular cross section. The alternative bushing apparatus 64 includes at least a first lobe 66 defining the first contact surface 36 and a second lobe 68 defining the second contact surface 38. It should be appreciated that the alternative bushing apparatus 64 may also define a third lobe 70 defining the third contact surface 40.

The alternative bushing apparatus 64 may include a first bushing apparatus 34 and a second bushing apparatus 34 spaced from the first bushing apparatus 34 along the longitudinal axis L. Each of the first bushing apparatus 34 and the second bushing apparatus 34 each define the first lobe 66, the second lobe 68 and the third lobe 70. However, it should be appreciated that the first bushing apparatus 34 and the second bushing apparatus 34 may be integrally formed as a single alternative bushing apparatus 64 having a plurality of first lobes 66 spaced from each other along the longitudinal axis L, a plurality of second lobes 68 spaced from each other along the longitudinal axis L and a plurality of third lobes 70 spaced from each other along the longitudinal axis L.

The upper jacket 26 of the alternative embodiment of the steering column assembly 62 defines at least one opening 71. Preferably, the upper jacket 26 defines a pair of openings 71 spaced form each other along the longitudinal axis L. The non-continuous cross section of the alternative bushing apparatus 64 defines a first longitudinal edge 72 extending parallel to the longitudinal axis L and a second longitudinal edge 74 extending parallel to the longitudinal axis L and opposing the first longitudinal edge 72. The first lobe 66 defines a split lobe having a first half 76 disposed along the first longitudinal edge 72 and a second half 78 disposed along the second longitudinal edge 74. Preferably, the alternative bushing apparatus 64 of the first alternative embodiment of the steering column assembly 62 is manufactured prior to assembly 20. However, it is contemplated that the alternative bushing apparatus 64 may be injection molded in place.

A first tab 80 partially defines the first longitudinal edge 72, and extends through the at least one opening 71. A second tab 82 partially defines the second longitudinal edge 74, and extends through the at least one opening 71. The first tab 80 opposes the second tab 82. The threaded adjuster 58 interconnects the first longitudinal edge 72 and the second longitudinal edge 74 of the bushing apparatus 34. More specifically, the threaded adjuster 58 interconnects the first tab 80 and the second tab 82. Accordingly, the compression device 56 is coupled to one of the upper jacket 26 and the lower jacket 24 through the alternative bushing apparatus 64, i.e., the compression device 56 is coupled to the alternative bushing apparatus 64 and the alternative bushing apparatus 64 is coupled to one of the upper jacket 26 and the lower jacket 24 by the locating device 42.

One of the first tab 80 and the second tab 82 defines a smooth bore 84 and the other of the first tab 80 and the second tab 82 defines a threaded bore 86. The threaded adjuster 58 extends through the smooth bore 84 in sliding engagement with the smooth bore 84 and into threaded engagement with the threaded bore 86. The compressive force is applied and the slip resistance increased by advancing the threaded adjuster 58 into the threaded bore 86, thereby drawing the first longitudinal edge 72 and the second longitudinal edge 74 of the bushing apparatus 34 together and urging the split lobe adjacent the first longitudinal edge 72 and the second longitudinal edge 74 radially inward toward the longitudinal axis L and against the lower jacket 24. The compressive force is released and the slip resistance is lessened by withdrawing the threaded adjuster 58 from the threaded bore 86, thereby permitting the first longitudinal edge 72 and the second longitudinal edge 74 to separate and the split lobe adjacent the first longitudinal edge 72 and the second longitudinal edge 74 to move radially outward away from the longitudinal axis L and away form the lower jacket 24. It should be appreciated that the alternative bushing apparatus 64 may include a plurality of first tabs 80 and a plurality of second tabs 82 corresponding in number to the number of openings 71 in the upper jacket 26.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   a lower jacket extending along a longitudinal axis;
   an upper jacket longitudinally moveable relative to said lower jacket along said longitudinal axis, said upper jacket including a circular cross section having a diameter and said lower jacket including a circular cross section having a diameter less than said diameter of said upper jacket;
   a bushing apparatus disposed between said lower jacket and said upper jacket and defining at least a first contact surface and a second contact surface, said bushing apparatus being coupled to said upper jacket;
   an adjustable compression device coupled to one of said upper jacket and said lower jacket for applying a compressive force directed radially inward toward said longitudinal axis to said first contact surface and resisted by said second contact surface to obtain a desired slip resistance between said bushing apparatus and one of said upper jacket and said lower jacket; and
   a locating device interconnecting said bushing apparatus and said upper jacket to fixedly locate said bushing apparatus relative to said upper jacket.

2. An assembly as set forth in claim 1 wherein said upper jacket defines at least one aperture and said locating device includes at least one lug mounted to said bushing apparatus with said at least one lug extending through said at least one aperture.

3. A steering column assembly for a vehicle, said assembly comprising:
   a lower jacket extending along a longitudinal axis;
   an upper jacket longitudinally moveable relative to said lower jacket along said longitudinal axis;
   a bushing apparatus disposed between said lower jacket and said upper jacket and defining at least a first contact surface, a second contact surface and a third contact surface with said first contact surface, said second contact surface and said third contact surface radially disposed about said longitudinal axis;
   an adjustable compression device coupled to one of said upper jacket and said lower jacket for applying a compressive force directed radially inward toward said longitudinal axis to said first contact surface and resisted by said second contact surface to obtain a desired slip resistance between said bushing apparatus and one of said upper jacket and said lower jacket; and
   said compression device including a threaded adjuster in threaded engagement with said upper jacket and coupled to said bushing apparatus.

4. An assembly as set forth in claim 3 wherein said bushing apparatus includes a first block extending along said longitudinal axis and defining said first contact surface, a second block extending along said longitudinal axis and defining said second contact surface, and a third block extending along said longitudinal axis and defining said third contact surface.

5. An assembly as set forth in claim 4 wherein said first contact surface includes a plurality of first contact surfaces spaced from each other along said longitudinal axis, said second contact surface includes a plurality of second contact surfaces spaced from each other along said longitudinal axis and said third contact surface includes a plurality of third contact surfaces spaced from each other along said longitudinal axis.

6. An assembly as set forth in claim 4 wherein said compression device is coupled to one of said first block, said second block and said third block.

7. A steering column assembly for a vehicle, said assembly comprising:
   a lower jacket extending along a longitudinal axis;
   an upper jacket longitudinally moveable relative to said lower jacket along said longitudinal axis, said upper jacket including a circular cross section having a diameter and said lower jacket including a circular cross section having a diameter less than said diameter of said upper jacket;
   a bushing apparatus disposed between said lower jacket and said upper jacket and defining at least a first contact surface and a second contact surface, wherein said first contact surface is disposed opposite said longitudinal axis from said second contact surface;
   an adjustable compression device coupled to one of said upper jacket and said lower jacket for applying a compressive force directed radially inward toward said longitudinal axis to said first contact surface and resisted by said second contact surface to obtain a desired slip resistance between said bushing apparatus and one of said upper jacket and said lower jacket; and said bushing apparatus including a non-continuous circular cross section having a first lobe defining said first contact surface, a second lobe defining said second contact surface and a third lobe defining said third contact surface.

8. An assembly as set forth in claim 7 wherein said non-continuous cross section of said bushing apparatus defines a first longitudinal edge extending parallel to said longitudinal axis and a second longitudinal edge extending parallel to said longitudinal axis and opposing said first longitudinal edge.

9. An assembly as set forth in claim 8 wherein compression device includes at least one threaded adjuster interconnecting said first longitudinal edge and said second longitudinal edge of said bushing apparatus.

10. An assembly as set forth in claim 9 wherein said upper jacket defines at least one opening and said bushing apparatus includes a first tab partially defining said first longitudinal edge and extending through said at least one opening and a second tab partially defining said second longitudinal edge and extending through said at least one opening in opposition with said first tab with said threaded adjuster interconnecting said first tab and said second tab.

11. An assembly as set forth in claim 10 wherein said first tab includes a plurality of first tabs spaced from each other along said longitudinal axis and said second tab includes a plurality of second tabs spaced from each other along said longitudinal axis.

12. A steering column assembly for a vehicle, said assembly comprising:
 a lower jacket extending along a longitudinal axis;
 an upper jacket longitudinally moveable relative to said lower jacket along said longitudinal axis;
 a bushing apparatus disposed between said lower jacket and said upper jacket and defining at least a first contact surface and a second contact surface;
 an adjustable compression device coupled to one of said upper jacket and said lower jacket for applying a compressive force directed radially inward toward said longitudinal axis to said first contact surface and resisted by said second contact surface to obtain a desired slip resistance between said bushing apparatus and one of said upper jacket and said lower jacket; and
 said bushing apparatus further comprising a polymer material.

13. A method of assembling a steering column assembly including a lower jacket and an upper jacket having a compression device coupled to the upper jacket with the upper jacket longitudinally moveable along a longitudinal axis relative to said lower jacket, said method comprising the steps of:
 inserting the lower jacket into the upper jacket;
 injecting a polymer material between the upper jacket and the lower jacket to form a bushing apparatus;
 compressing the compression device against the bushing apparatus to obtain a desired slip resistance between the bushing apparatus and the lower jacket; and
 wherein the compression device includes a threaded adjuster coupled to the bushing apparatus and said step of compression the compression device is further defined as advancing the threaded adjuster to apply a compressive force directed radially inward toward the longitudinal axis against the bushing apparatus.

\* \* \* \* \*